(12) United States Patent
Shen (10) Patent No.: US 10,579,299 B2
(45) Date of Patent: Mar. 3, 2020

(54) METHOD, APPARATUS, SERVER AND STORAGE MEDIUM OF ERASING CLOUD HOST IN CLOUD-COMPUTING ENVIRONMENT

(71) Applicant: Ping An Technology (Shenzhen) Co., LTD., Shenzhen (CN)

(72) Inventor: Yong Shen, Shenzhen (CN)

(73) Assignee: PING AN TECHNOLOGY (SHENZHEN) CO, LTD., Shenzhen (CN)

( * ) Notice: Subject to any disclaimer, the term of this patent is extended or adjusted under 35 U.S.C. 154(b) by 76 days.

(21) Appl. No.: 15/578,692

(22) PCT Filed: Feb. 15, 2017

(86) PCT No.: PCT/CN2017/073668
§ 371 (c)(1),
(2) Date: Nov. 30, 2017

(87) PCT Pub. No.: WO2017/157125
PCT Pub. Date: Sep. 21, 2017

(65) Prior Publication Data
US 2019/0227730 A1     Jul. 25, 2019

(30) Foreign Application Priority Data
Mar. 15, 2016   (CN) .......................... 2016 1 0148257

(51) Int. Cl.
*G06F 3/06* (2006.01)
*G06F 21/62* (2013.01)
(Continued)

(52) U.S. Cl.
CPC ............ *G06F 3/0652* (2013.01); *G06F 3/061* (2013.01); *G06F 3/067* (2013.01); *G06F 3/0608* (2013.01);
(Continued)

(58) Field of Classification Search
CPC ...... G06F 3/0652; G06F 9/4881; G06F 3/061; G06F 3/067; G06F 3/0608; G06F 9/45558; G06F 2009/45575; G06F 2009/45583
See application file for complete search history.

(56) References Cited

U.S. PATENT DOCUMENTS

| 5,715,386 A | 2/1998 | Fulton, III et al. |
| 2007/0260702 A1 | 11/2007 | Richardson et al. |

(Continued)

FOREIGN PATENT DOCUMENTS

| CN | 101938416 A | 1/2011 |
| CN | 102427481 A | 4/2012 |

(Continued)

OTHER PUBLICATIONS

European Search Report for European Application No. 17765667.5 0 1221/3279795 PCT/CN2017073668 dated Dec. 19, 2018.
(Continued)

*Primary Examiner* — Tasnima Matin
(74) *Attorney, Agent, or Firm* — Rimon PC (57) ABSTRACT

A method of erasing a cloud host in a cloud-computing environment includes: receiving a cloud host secure erasing request; generating an erase instruction according to the request; and sending the erase instruction to a secure erasing server, such that the secure erasing server calls a secure erasing daemon process on the corresponding host machine according to the erase instruction, and erases the cloud host to be erased on the host machine via the secure erasing daemon process.

9 Claims, 4 Drawing Sheets

(51) Int. Cl.
*G06F 9/50* (2006.01)
*G06F 9/455* (2018.01)
*G06F 9/48* (2006.01)

(52) U.S. Cl.
CPC ........ *G06F 9/45558* (2013.01); *G06F 9/4881* (2013.01); *G06F 9/50* (2013.01); *G06F 21/62* (2013.01); *G06F 2009/45575* (2013.01); *G06F 2009/45583* (2013.01)

(56) References Cited

U.S. PATENT DOCUMENTS

| | | | |
|---|---|---|---|
| 2009/0113124 | A1 | 4/2009 | Kataoka et al. |
| 2011/0055588 | A1* | 3/2011 | DeHaan ................ G06F 1/3209 713/189 |
| 2011/0113124 | A1 | 5/2011 | Zhang |
| 2011/0197192 | A1 | 8/2011 | Kataoka et al. |
| 2013/0067166 | A1 | 3/2013 | Kataoka et al. |
| 2013/0227085 | A1 | 8/2013 | Choi et al. |
| 2013/0254460 | A1 | 9/2013 | Islam et al. |
| 2013/0254507 | A1 | 9/2013 | Islam et al. |
| 2016/0197843 | A1 | 7/2016 | Palan et al. |
| 2016/0259834 | A1* | 9/2016 | Bishop .................... G06F 16/27 |

FOREIGN PATENT DOCUMENTS

| | | |
|---|---|---|
| CN | 102427481 Y | 4/2012 |
| CN | 102624555 A | 8/2012 |
| CN | 102882908 A | 1/2013 |
| CN | 104303175 A | 1/2015 |
| CN | 105306551 A | 2/2016 |
| CN | 106980537 A | 7/2017 |
| EP | 3 279 795 A1 | 2/2018 |
| JP | 2009-104530 A | 5/2009 |
| JP | 2013-77106 A | 4/2013 |
| JP | 2018-517210 A | 6/2018 |
| KR | 10-2018-0122593 A | 11/2018 |
| SG | 11201708947 R | 11/2017 |
| WO | 2017/157125 A1 | 9/2017 |

OTHER PUBLICATIONS

Chinese Office Action for Chinese Application No. 2016101482570 dated Mar. 15, 2016.
Xuedong, Qin. "Solution for KVM Private Cloud Management System Based on Drupal," New Technology of Library and Information Service, 2015, vol. 31 (11), pp. 91-95, available at: http://manu44.magtech.com.cn/Jwk_infotech_wk3/EN/10.11925/infotech.1003-3513.2015.11.13.
State Intellectual Property Office of The People's Republic of China, Written Opinion for International Application No. PCT/CN2017/073668 dated Apr. 27, 2017 (partial English translation attached).
Examination Report No. 1 received for Australian Patent Application Serial No. 2017232694 dated Oct. 25, 2018, 3 pages.
First Office Action received for Chinese Patent Application Serial No. 201610148257.0 dated Oct. 29, 2018, 13 pages (English Translation attached).
International Preliminary Report on Patentibilty received for International Patent Application Serial No. PCT/CN2017/073668 dated Sep. 27, 2018, 5 pages.
Decision to Grant a Patent received for Japanese Patent Application Serial No. 2017-561741 dated Dec. 18, 2018, 6 pages (English Translation attached).
Communication pursuant to Rules 70(2) and 70a(2) EPC received for European Patent Application Serial No. 17765667.5 dated Jan. 8, 2019, 1 page.
Notification of Reasons for Refusal received for Japanese Patent Application Serial No. 2017-561741 dated Sep. 11, 2018, 4 pages (English Translation attached).
European Patent Office, European Communication Pursuant to Article 94(3) EPC for European Application No. 17765667.5 dated Nov. 28, 2019.

* cited by examiner

METHOD, APPARATUS, SERVER AND STORAGE MEDIUM OF ERASING CLOUD HOST IN CLOUD-COMPUTING ENVIRONMENT

CROSS-REFERENCE TO RELATED APPLICATIONS

The present application is the US national phase application of international application PCT/CN2017/073668 that was filed on Feb. 15, 2017 and claims priority to Chinese Patent Application No. 201610148257, filed on Mar. 15, 2016, in the State Intellectual 5 Property Office of China and entitled "Method, Apparatus, Server and Storage Medium of Erasing Cloud Host in Cloud-Computing Environment," the content of both being incorporated hereby by reference in their entirety.

FIELD OF THE INVENTION

The present disclosure relates to the field of cloud-computing, and particularly relates to a method, an apparatus, a server and a storage medium of erasing a cloud host in a cloud-computing environment.

BACKGROUND OF THE INVENTION

Cloud-computing is an Internet-based service relating to increasing, use, and deliver modes, which typically involves providing dynamic, easy to be expanded, and usually virtualized resources. In a conventional cloud-computing environment, a user can only implement a simple function of erasing a cloud host, which refers to labeling a memory space of the cloud host as not occupied, rather than erasing the related data of the cloud host actually, such that the cloud host still occupies a lot of system resources and results in a waste of resources. Additionally, the related data of the cloud host can be easily recovered, which may lead to a divulge of information when the cloud host has stored a lots of sensitive information related to users, and the information security is at stake.

SUMMARY OF THE INVENTION

According to various embodiments of the present disclosure, a method, an apparatus, a server and a storage medium of erasing a cloud host in a cloud-computing environment are provided.

A method of erasing a cloud host in a cloud-computing environment includes:
  receiving a request of secure erasing a cloud host;
  generating an erase instruction according to the request of secure erasing the cloud host; and
  sending the erase instruction to a secure erasing server, such that the secure erasing server calls a secure erasing daemon process on a corresponding host machine according to the erase instruction, and erases the cloud host to be erased from the host machine via the secure erasing daemon process.

An apparatus of erasing a cloud host in a cloud-computing environment includes:
  a receiver module configured to receive a request of secure erasing a cloud host;
  a generator module configured to generate an erase instruction according to the request of secure erasing the cloud host; and
  an erase module configured to send the erase instruction to a secure erasing server, such that the secure erasing server calls a secure erasing daemon process on the corresponding host machine according to the erase instruction, and erases the cloud host to be erased from the host machine via the secure erasing daemon process.

A server configured to erase a cloud host in a cloud-computing environment, the server includes a processor; and a memory storing instructions, which, when executed by the processor cause the processor to perform steps including:
  receiving a request of secure erasing a cloud host;
  generating an erase instruction according to the request of secure erasing the cloud host; and
  sending the erase instruction to a secure erasing server, such that the secure erasing server calls a secure erasing daemon process on a corresponding host machine according to the erase instruction, and erases the cloud host to be erased from the host machine via the secure erasing daemon process.

At least one non-transitory computer-readable storage medium having computer-readable instructions stored thereon, the instructions when executed by at least one processor cause the at least one processor to perform steps include:
  receiving a request of secure erasing a cloud host;
  generating an erase instruction according to the request of secure erasing the cloud host; and
  sending the erase instruction to a secure erasing server, such that the secure erasing server calls a secure erasing daemon process on a corresponding host machine according to the erase instruction, and erases the cloud host to be erased from the host machine via the secure erasing daemon process.

The details of one or more embodiments of the present disclosure will be presented with reference to the following drawings and description. Other characteristic, purposes and advantages of the present disclosure will be more apparent from the specification, drawing and claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the purpose, technical solution and advantages of the present disclosure will be more apparent. It should be understood that the particular embodiments are described for the purpose of illustrating as opposed to restricting the present invention.

Figure 1:
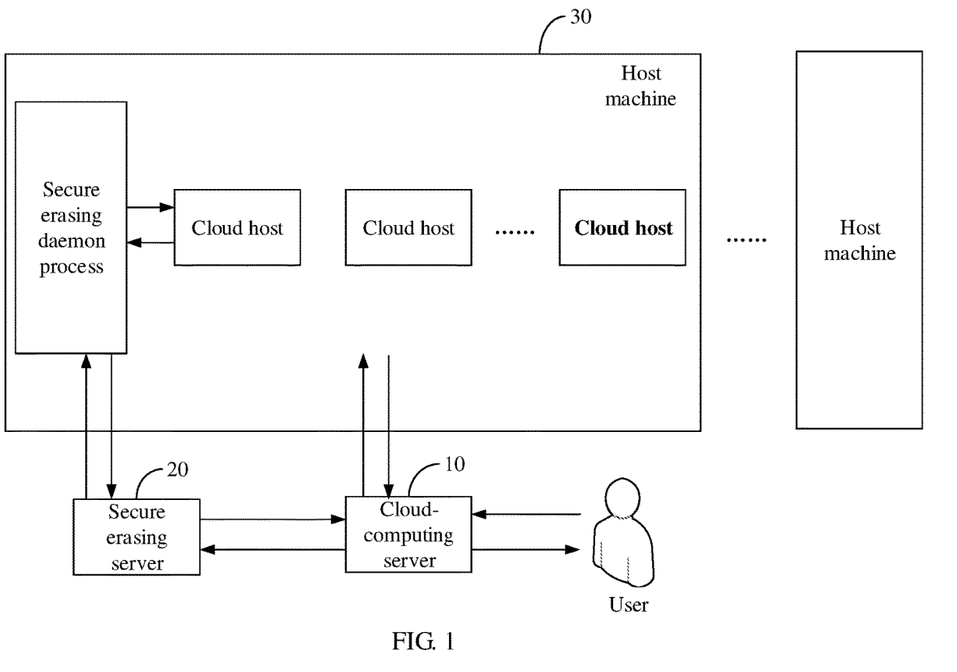
FIG. 1 is a block diagram of a cloud-computing environment for a method of erasing a cloud host according to an embodiment.

FIG. 1 is a block diagram of an exemplary cloud-computing environment for a method of erasing a cloud host according to an embodiment. As shown in FIG. 1, a virtual machine can be established on a plurality of host machines through a cloud-computing server 10. The virtual machine is configured to run the cloud host, which is uniformly administered by the cloud-computing server 10. When a user chooses to erase the cloud host from the cloud-computing server 10, the cloud-computing server 10 receives the request of secure erasing the cloud host, and determines the cloud host to be erased and the corresponding erasing manner according to the user's selection. The cloud-computing server 10 shuts down the cloud host to be erased on the host machine 30 and generates an erase instruction according to the request of secure erasing the cloud host. The cloud-computing server 10 sends the erase instruction to the secure erasing server 20 which calls the secure erasing daemon process on the corresponding host machine 30, the secure erasing daemon process on the host machine 30 erases related data on the cloud host to be erased, and an erase result is returned to the secure erasing server 20 after the erasing. The secure erasing server 20 sends an erase completion instruction, the secure erasing server 20 erases the virtual machine corresponding to the cloud host to be erased on the host machine 30 after receiving the erase completion instruction and return the user with an information on the successful erasure of the cloud host.

Figure 2:
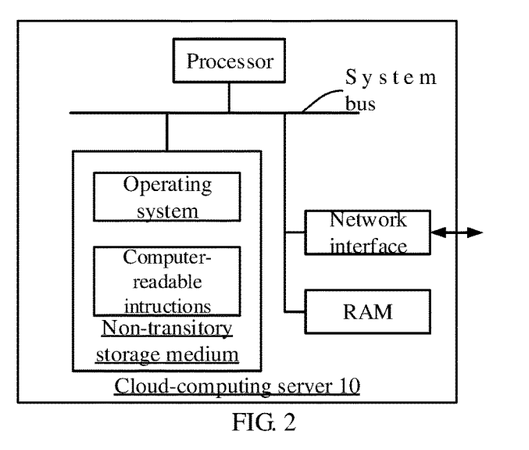
FIG. 2 is a block diagram of a server according to an embodiment.

FIG. 2 is a block diagram of the cloud-computing server in an embodiment. As shown in FIG. 2, the cloud-computing server 10 includes a processor, a non-transitory storage medium, a random access memory (RAM) and a network interface connected through a system bus. The processor of the cloud-computing server 10 is configured to provide computation and control capability to support the operation of the entire cloud-computing server 10. Operating system and computer-readable instructions are stored in the non-transitory storage medium of the cloud-computing server 10. The computer-readable instructions are configured to, when being executed by the processor, implement a method of erasing a cloud host in a cloud-computing environment. The RAM of the cloud-computing server 10 provides an operation environment with a high speed cache for the operating system and the computer-readable instructions in the non-transitory storage medium. The network interface of the cloud-computing server 10 is configured to communicate with the secure erasing server 20 and the host machine 10, such as sending erase instructions to the secure erasing server 20 and so on. The cloud-computing server 10 can be an independent server or be implemented by way of a server group composed of a plurality of servers. A person skilled in the art should understand, FIG. 2 is exemplary to show the structure of the server 10 in accordance with an embodiment of the present disclosure and does not limit the cloud-computing server 10 to this embodiment; in other embodiments, compared with the structure shown in FIG. 2, the particular cloud-computing server 10 may include more or less components, be configured with other components not shown in FIG. 2, or have a different configuration.

Figure 3:
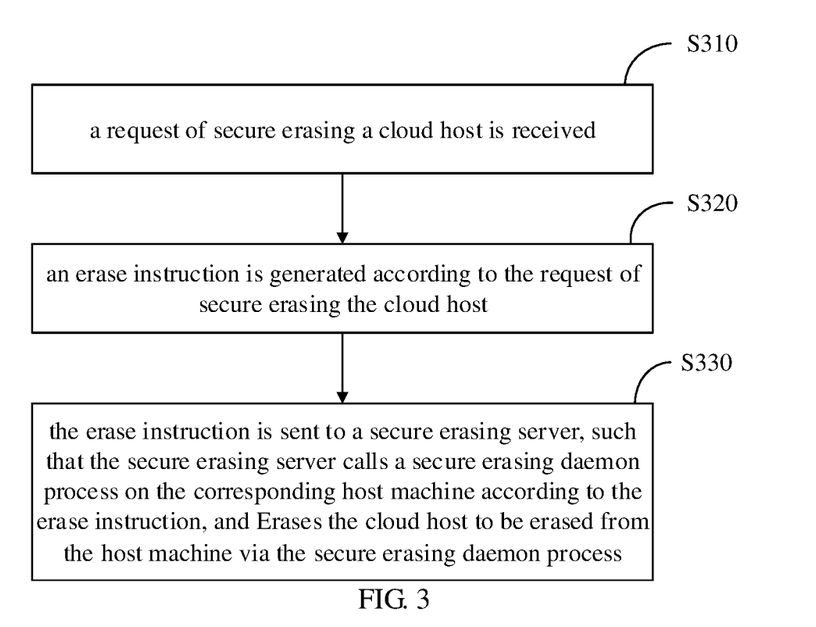
FIG. 3 is a flowchart of a method of erasing a cloud host in a cloud-computing environment according to an embodiment.

As shown in FIG. 3, in an embodiment, a method of erasing a cloud host in a cloud-computing environment is provided, which includes steps as follows.

In step S310, a request of secure erasing a cloud host is received.

A button or a choice box or the like to securely erase the cloud host can be added into the cloud-computing user interface on the client of the cloud-computing server, the user can confirm whether to erase the cloud host by clicking the button or choice box, the user may also choose to erase one or more cloud hosts in the cloud-computing environment. When the user confirms to erase the selected cloud host, the cloud-computing server can receive the request of secure erasing the cloud host sent by the client.

Figure 4:
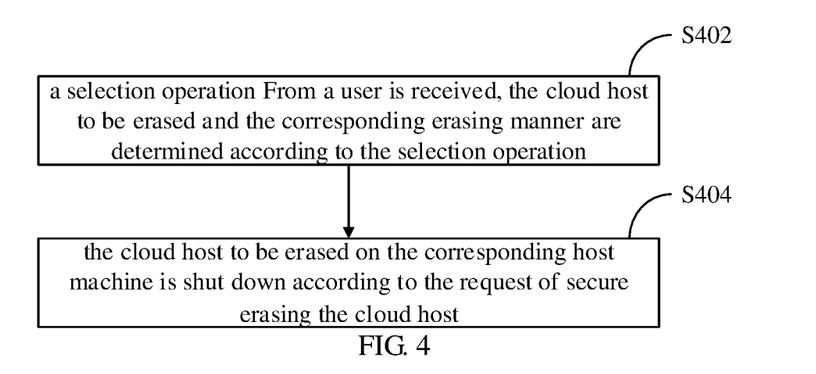
FIG. 4 is a flowchart of determining a cloud host to be erased, and the corresponding erasing manner.

As shown in FIG. 4, in an embodiment, after step S310 where a request of secure erasing a cloud host is received, the method further includes steps as follows.

In step S402, a selection operation from a user is received, the cloud host to be erased, and the corresponding erasing manner are determined according to the selection operation.

The user may select one or more cloud hosts to be erased from a cloud-computing user interface of the client of the cloud-computing server, and select the manner of erasing corresponding to each cloud host respectively. The manner can be a basic one-time erasing, an advanced three-time erasing, a complex seven-time erasing, a super complex thirty-five time-erasing and so on, but not limited thereto. The more times of erasings, the more difficult to recover the erased data, and the higher the security level, while the more resources such manner consumes.

In step S404, the cloud host to be erased on the corresponding host machine is shut down according to the request of secure erasing the cloud host.

The request of secure erasing the cloud host may include the number or sign of the cloud host to be erased and the number of the host machine and other information. The cloud-computing server can determine the cloud host to be erased by the number or sign of the cloud host to be erased and shut down the cloud host to be erased and selected by the user through the Hypervisor on the host machine where it belongs. The host machine is a host computer where a virtual machine is installed to run the cloud host, the host computer is the host machine compared to the virtual machine which can only operate normally in the host computer, the host computer is a "host". Hypervisor is an intermediate software layer operates between the physical server and the operating system, which allows several operating systems and applications to share one set of basic physical hardware, which therefore can be viewed as an elementary operating system in the virtual environment. Hypervisor can coordinate the access to all physical equipment and virtual machines on the server, and also called a virtual monitor. When the host machine starts and executes the Hypervisor, it will load operating systems of all cloud hosts on the host machine and meanwhile allocate each cloud host with an appropriate amount of RAM, CPU, network, disk and other resources.

In step S320, an erase instruction is generated according to the request of secure erasing the cloud host.

The cloud-computing server can generate a corresponding erase instruction according to the request of secure erasing the cloud host received.

In step S330, the erase instruction is sent to a secure erasing server, such that the secure erasing server calls a secure erasing daemon process on the corresponding host machine according to the erase instruction, and erases the cloud host to be erased from the host machine via the secure erasing daemon process.

The cloud-computing server sends the erase instruction to a secure erasing server, after receiving the erase instruction, the secure erasing server calls a secure erasing daemon process on the corresponding host machine according to the erase instruction.

The secure erasing daemon process on the host machine erases a file, data and the like that are related to the cloud host to be erased to make sure that the data of the cloud host cannot be recovered. The cloud-computing server can release the resources formerly occupied by the erased cloud host via the Hypervisor on the corresponding host machine.

According to the foregoing method of erasing a cloud host in a cloud-computing environment, the cloud-computing server receives the request of secure erasing the cloud host and sends an erase instruction to the secure erasing server which, according to the erase instruction, can call a secure erasing daemon process thereby erasing the corresponding cloud host. The administrative functionalities of the host machine and the cloud-computing server are properly employed to implement the erasing of the cloud host, the resources are released and the resources wasting is reduced, and the relevant data of the cloud host cannot be recovered after erasing, such that the information security of the user is guaranteed.

Figure 5:
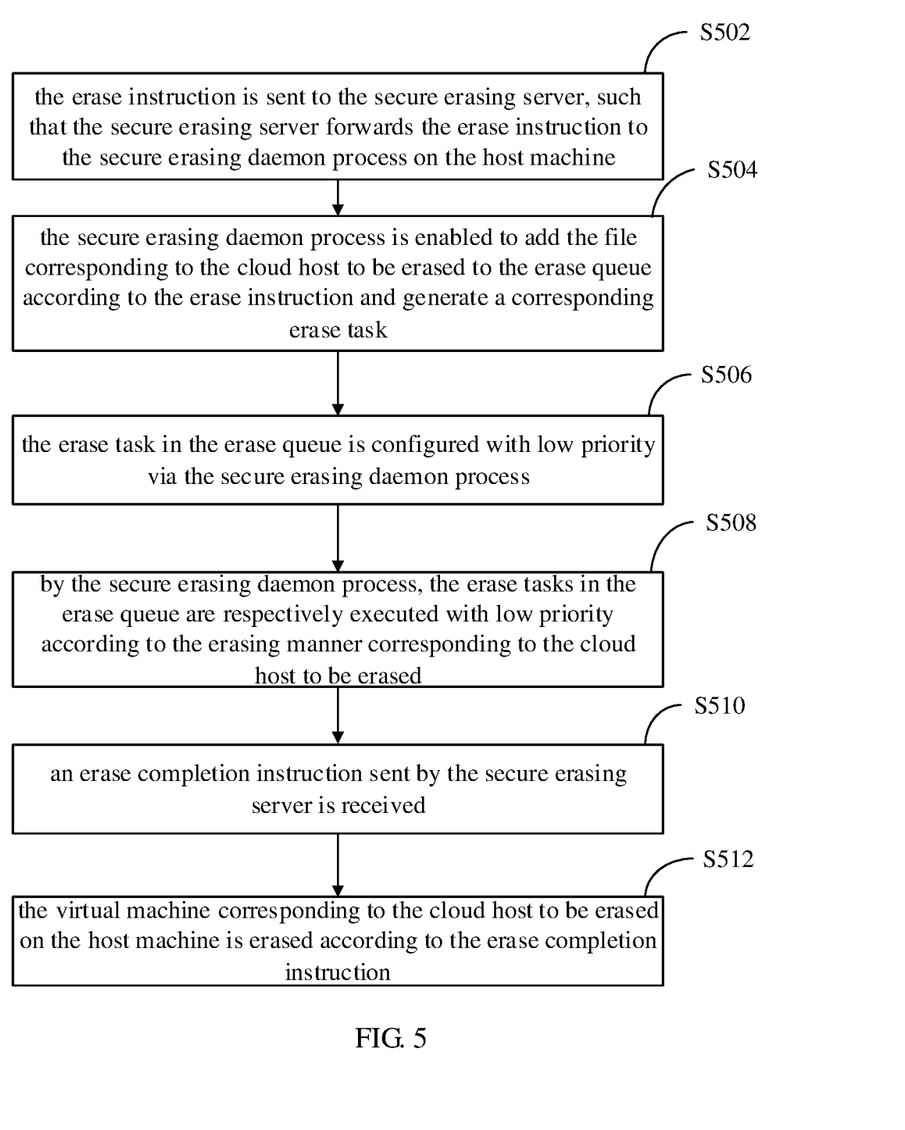
FIG. 5 is a flowchart of erasing a cloud host to be erased on a corresponding host machine.

As shown in FIG. 5, in an embodiment, the foregoing method of erasing a cloud host in a cloud-computing environment further includes steps of:

In step S502, the erase instruction is sent to the secure erasing server, such that the secure erasing server forwards the erase instruction to the secure erasing daemon process on the host machine.

The cloud-computing server can generate a corresponding erase instruction according to the request of secure erasing the cloud host received. The secure erasing server forwards the received erase instruction to the secure erasing daemon process on the host machine where the cloud host belongs to erase the data of the cloud host to be erased.

In step S504, by the secure erasing daemon process, the file corresponding to the cloud host to be erased is added to the erase queue according to the erase instruction and generate a corresponding erase task.

After receiving the erase instruction sent by the secure erasing server, the secure erasing daemon process on the host machine where the cloud host to be erased belongs can add one or more files corresponding to the cloud host to be erased to the erase queue according to the erase instruction and generate a corresponding erase task.

In step S506, the erase task in the erase queue is configured with low priority via the secure erasing daemon process.

The secure erasing daemon process can configure the erase task in the erase queue with low priority, thereby reducing the impact of erasing cloud host over the normal operation of other cloud hosts. Other normally operating tasks of other cloud hosts in the host machine can be configured with high priority to execute tasks of other cloud hosts with preference and then the tasks in the erase queue are executed, such that the impact of erasing the cloud host over other cloud hosts in the host machine is minimized.

In step S508, by the secure erasing daemon process, the erase tasks in the erase queue are respectively executed with low priority according to the erasing manner corresponding to the cloud host to be erased.

The secure erasing daemon process can respectively execute the erase tasks in the erase queue according to the erasing manner selected by the user and corresponding to the cloud host to be erased to erase the corresponding file of the cloud host to be erased. The more times of erasings the user selects, the greater the intensity of the erasure, the higher the security level, while the more resources such manner consumes.

In step S510, an erase completion instruction sent by the secure erasing server is received.

Each time the secure erasing daemon process completes an erasing task in the erase queue, a result of the successful erasure can be returned to the secure erasing server which can store the erase result. When the number of the results received by the secure erasing server is identical to the number of the cloud hosts the user selected to erase, the erasure is suggested to be completed.

After the erasure is completed, the secure erasing server sends an erase completion instruction to the cloud-computing server.

In step S512, the virtual machine corresponding to the cloud host to be erased on the host machine is erased according to the erase completion instruction.

After the cloud-computing server received the erase completion instruction, the corresponding virtual machine on the cloud host to be erased can be erased and, via the Hypervisor on the host machine, the formerly allocated RAM, CPU, network disk and other resources are released, the wasting of resources is reduced. After the successful erasure of the cloud host, an information on the successful erasure can be sent to the user via the cloud-computing user interface or through email or by other manners.

In the present embodiment, the secure erasing process on the host machine, by adding the file of the cloud host to be erased into the erase queue and erasing the same with low priority, can reduce the impact of the erasing of the cloud host over the normal operations of other cloud hosts in the host machine, after the successful erasure of the data of the cloud host, the resources occupied by the erased cloud hosts are released to reduce resource wasting.

In an embodiment, the foregoing method of erasing a cloud host in an cloud-computing environment further includes the step of determining an input/output (I/O) resource consumption of a disk according to a disk space, a space occupied by the cloud host to be erased, and the corresponding erasing manner.

The I/O resource consumption of the disk can be determined according to the disk resource of the host machine where the cloud host belongs, space occupied by the cloud host to be erased, and the corresponding erasing manner. The number of erasings is pro rata to the disk I/O resource consumption, the more times of erasings, the more disk I/O resources to be consumed. The cloud-computing, after the user has selected the cloud host to be erased, and the corresponding erasing manner, can determine the disk I/O resource consumption, a notification can be returned to the user in the case the I/O resource consumption is over a preset threshold value to suggest that the disk I/O resource is over consumed and the erasing manner should be re-selected. The preset threshold value can either be customized by the user or set by the cloud service provider to assist the user to properly use the cloud host secure erasing feature and configure the disk I/O resources so as to reduce unnecessary resource wasting.

In the present embodiment, the cloud-computing server can determine the disk I/O resource consumption and help the user to properly use the cloud host erasing feature and appropriately configure the disk I/O resources so as to reduce unnecessary resource wasting.

Figure 6:
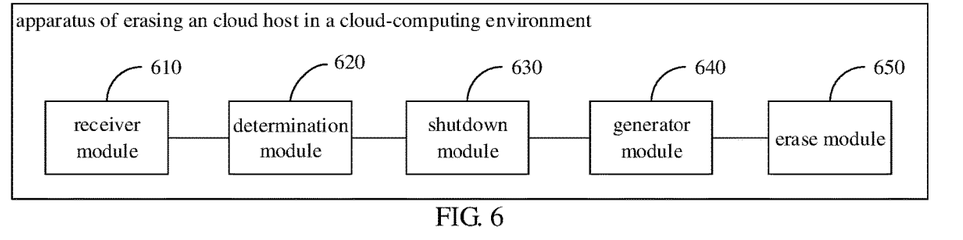
FIG. 6 is a block diagram of an apparatus of erasing a cloud host in a cloud-computing environment according to an embodiment.

As shown in FIG. 6, in an embodiment, an apparatus of erasing an cloud host in a cloud-computing environment is provided, which includes a receiver module 610, a determination module 620, a shutdown module 630, a generator module 640, and an erase module 650.

The receiver module is configured to receive the request of secure erasing the cloud host;

A button or a choice box or the like to securely erase the cloud host can be added into the cloud-computing user interface on the client of the cloud-computing server, the user can confirm whether to erase the cloud host by clicking the button or choice box, the user may also choose to erase one or more cloud hosts in the cloud-computing environment. When the user confirms to erase the selected cloud host, the cloud-computing server can receive the cloud host secure erasing request sent by the client.

The determination module 620 is configured to receive a selection operation from a user, the cloud host to be erased and the corresponding erasing are determined according to the selection operation.

The user may select one or more cloud hosts to be erased from a cloud-computing user interface of the client of the cloud-computing server, and select the manner of erasing corresponding to each cloud host respectively, the manner can be a basic one-time erasing, an advanced three-time erasing, a complex seven-time erasing, a super complex thirty-five time-erasing and so on, but not limited thereto, the more times of erasings, the more difficult to recover the erased data, and the higher the security level, while the more resources such manner consumes.

The shutdown module 630 is configured to shut down the cloud host to be erased on the corresponding host machine according to the request of secure erasing a cloud host.

The request of secure erasing the cloud host may include the number or sign of the cloud host to be erased and the number of the host machine and other information. The cloud-computing server can determine the cloud host to be erased by the number or sign of the cloud host to be erased and shut down the cloud host to be erased and selected by the user through the Hypervisor on the host machine where it belongs. The host machine is a host computer where a virtual machine is installed to run the cloud host, the host computer is the host machine compared to the virtual machine which can only operate normally in the host computer, the host computer is a "host". Hypervisor is an intermediate software layer operates between the physical server and the operating system, which allows several operating systems and applications to share one set of basic physical hardware, which therefore can be viewed as an elementary operating system in the virtual environment that coordinates the access to all physical equipment and virtual machines on the server, and also called a virtual monitor. When the host machine starts and executes the Hypervisor, it will load operating systems of all cloud hosts on the host machine and, in the meanwhile, allocates each cloud host with an appropriate amount of RAM, CPU, network and disk and other resources.

The generator module 640 is configured to generate an erase instruction according to the request of secure erasing the cloud host.

The cloud-computing server can generate a corresponding erase instruction according to the request of secure erasing the cloud host received.

The erase module 650 is configured to send the erase instruction to a secure erasing server, such that the secure erasing server calls a secure erasing daemon process on the corresponding host machine according to the erase instruction, and erases the cloud host to be erased from the host machine via the secure erasing daemon process.

The cloud-computing server sends the erase instruction to a secure erasing server, after receiving the erase instruction, the secure erasing server calls a secure erasing daemon process on the corresponding host machine according to the erase instruction. The secure erasing daemon process on the host machine erases a file, data and the like that are related to the cloud host to be erased to make sure that the data of the cloud host cannot be recovered. The cloud-computing server can release the resources formerly occupied by the erased cloud host via the Hypervisor on the corresponding host machine.

According to the foregoing apparatus of erasing a cloud host in a cloud-computing environment, the cloud-computing server receives the request of secure erasing the cloud host and sends an erase instruction to the secure erasing server which, according to the erase instruction, can call a secure erasing daemon process thereby erasing the corresponding cloud host. The administrative functionalities of the host machine and the cloud-computing server are properly employed to implement the erasing of the cloud host, the resources are released and the resources wasting is reduced, and the relevant data of the cloud host cannot be recovered after erasure, such that the information security of the user is secured.

Figure 7:
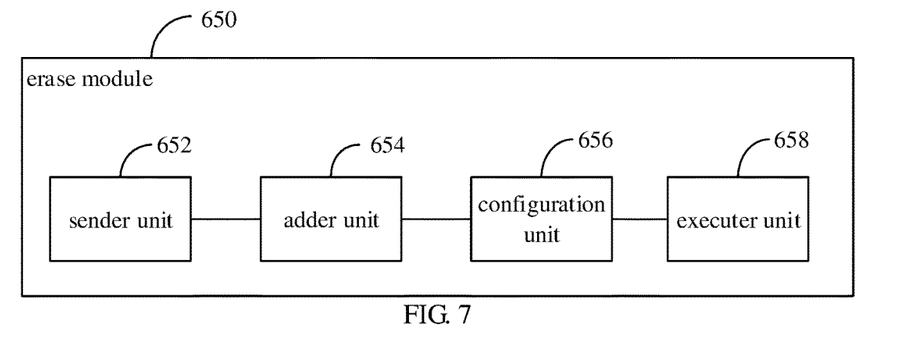
FIG. 7 is a block diagram of an erase module according to an embodiment.

As shown in FIG. 7, in an embodiment, in the foregoing apparatus of erasing a cloud host in a cloud-computing environment, the erase module 650 includes a sender unit 652, an adder unit 654, a configuration unit 656 and an executer unit 658.

The sender unit 652 is configured to send the erase instruction to the secure erasing server, such that the secure erasing server forwards the erase instruction to the secure erasing daemon process on the host machine.

The cloud-computing server can generate a corresponding erase instruction according to the request of secure erasing the cloud host received. The secure erasing server forwards the received erase instruction to the secure erasing daemon process on the host machine where the cloud host belongs to erase the data of the cloud host to be erased.

The adder unit 654 is configured to, by the secure erasing daemon process, add the file corresponding to the cloud host to be erased to the erase queue according to the erase instruction and generate a corresponding erase task.

The secure erasing daemon process on the host machine where the cloud host to be erased belongs, after receiving the erase instruction sent by the secure erasing server, can add one or more files corresponding to the cloud host to be erased to the erase queue according to the erase instruction and generate a corresponding erase task.

The configuration unit 656 is configured to configure the erase task in the erase queue with low priority via the secure erasing daemon process.

The secure erasing daemon process can configure the erase task in the erase queue with low priority, thereby reducing the impact of erasing cloud host over the normal operation of other cloud hosts. Other normally operating tasks of other cloud hosts in the host machine can be configure with high priority to execute tasks of other cloud hosts with preference and then the tasks in the erase queue are executed, such that the impact of erasing the cloud host over other cloud hosts in the host machine is minimized.

The executer unit 658 is configured to, by the secure erasing daemon process, execute the erase tasks in the erase queue respectively with low priority according to the erasing manner corresponding to the cloud host to be erased.

The secure erasing daemon process can respectively execute the erase tasks in the erase queue according to the erasing manner selected by the user and corresponding to the cloud host to be erased to erase the corresponding file of the cloud host to be erased. The more times of erasings the user selects, the greater the intensity of the erasure, the higher the security level, while the more resources such manner consumes.

In the present embodiment, the secure erasing process on the host machine, by adding the file of the cloud host to be erased into the erase queue and erasing the same with low priority, can reduce the impact of the erasing of the cloud host over the normal operations of other cloud hosts in the host machine.

In an embodiment, in the foregoing apparatus of erasing a cloud host in a cloud-computing environment, the receiver module 610 is further configured to receive an erase completion instruction sent by the secure erasing server.

Each time the secure erasing daemon process completes an erasing task in the erase queue, a result of the successful erasure can be returned to the secure erasing server which can store the erase result. When the number of the results received by the secure erasing server is identical to the number of the cloud hosts the user selected to erase, the erasure is suggested to be completed.

After the erasing is completed, the secure erasing server sends an erase completion instruction to the cloud-computing server.

The erase module is configured to erase the virtual machine corresponding to the cloud host to be erased on the host machine according to the erase completion instruction.

After the cloud-computing server received the erase completion instruction, the corresponding virtual machine on the cloud host to be erased can be erased and, via the Hypervisor on the host machine, the formerly allocated RAM, CPU, network disk and other resources are released, the wasting of resources is reduced. After the successful erasure of the cloud host, an information on the successful erasure can be sent to the user via the cloud-computing user interface or through email or by other manners.

In the present embodiment, after the successful erasing of the data of the cloud host, the resources occupied by the erased cloud host can be released to reduce resource wasting.

Figure 8:
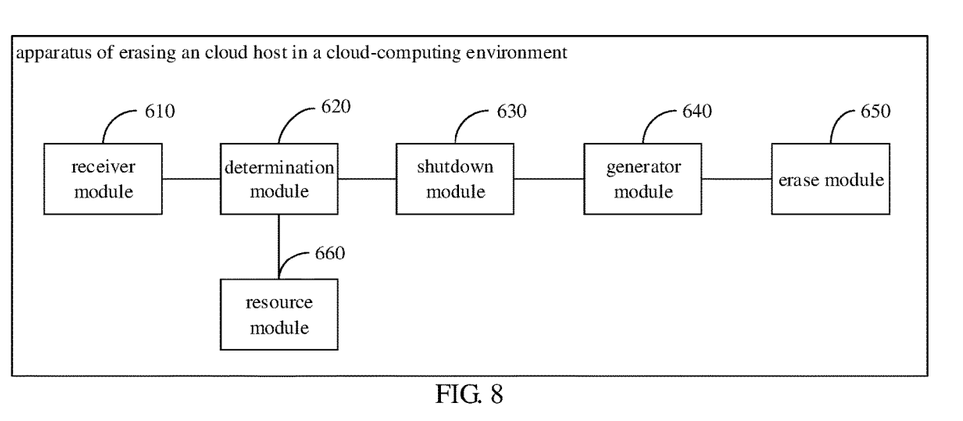
FIG. 8 is a flowchart of an apparatus of erasing a cloud host in a cloud-computing environment according to another embodiment.

As shown in FIG. 8, in an embodiment, the apparatus of erasing an cloud host in a cloud-computing environment, in addition to the receiver module 610, the determination module 620, the shutdown module 630, the generator module 640 and the erase module 650, further includes a resource module 660.

The resource module 660 is configured to determine the I/O resource consumption of the disk according to a disk space, a space occupied by the cloud host to be erased, and the corresponding erasing manner.

The disk I/O resource consumption can be determined according to the disk resource of the host machine where the cloud host belongs, space occupied by the cloud host to be erased, and the corresponding erasing manner. The number of erasings is pro rata to the disk I/O resource consumption, the more times of erasings, the more disk I/O resources to be consumed. The cloud-computing, after the user has selected the cloud host to be erased, and the corresponding erasing manner, can determine the disk I/O resource consumption, a notification can be returned to the user in the case the I/O resource consumption is over a preset threshold value to suggest that the disk I/O resource is over consumed and the erasing manner should be re-selected. The preset threshold value can either be customized by the user or set by the cloud service provider to assist the user to properly use the cloud host secure erasing feature and configure the disk I/O resources so as to reduce unnecessary resource wasting.

In the present embodiment, the cloud-computing server can determine the disk I/O resource consumption and help the user to properly use the cloud host erasing feature and appropriately configure the disk I/O resources so as to reduce unnecessary resource wasting.

The various modules of the apparatus of erasing a cloud host in a cloud-computing environment can be implemented, in part or as a whole, by software, hardware or the combinations thereof. For example, in terms of a hardware implementation, the foregoing erase module 650 can send the erase instruction to the secure erasing server via the network interface of the cloud-computing server, the network interface can be an Ethernet card or a wireless card and so on. The foregoing modules can be embedded in or independent from the processor(s) of a cloud-computing server and in the form of hardware, or be stored in a RAM of a cloud-computing server and in the form of software, so as to facilitate the processor(s) to call and execute corresponding steps of the foregoing various modules, the processor can be a CPU or a microprocessor and so on.

A person skilled in the art should understand that the processes of the methods in the above embodiments can be, in full or in part, implemented by computer programs instructing underlying hardware, the programs can be stored in a computer-readable storage medium, the program can include the processes in the embodiments of the various methods when it is being executed. The storage medium can be a disk, a CD, a Read-Only Memory (ROM) and other non-transitory storage mediums or a RAM and so on.

The different technical features of the above embodiments can have various combinations which are not described for the purpose of brevity. Nevertheless, to the extent the combining of the different technical features do not conflict with each other, all such combinations must be regarded as being within the scope of the disclosure.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of erasing a cloud host in a cloud-computing environment, comprising:
receiving a request of secure erasing a cloud host;
receiving a selection from a user, and determining the cloud host to be erased and a corresponding erasing manner according to the selection;
shutting down the cloud host to be erased on the corresponding host machine according to the request of secure erasing the cloud host;
generating an erase instruction according to the request of secure erasing the cloud host; and sending the erase instruction to a secure erasing server, such that the secure erasing server calls a secure erasing daemon process on a corresponding host machine according to the erase instruction, and erases the cloud host to be erased from the host machine via the secure erasing daemon process, wherein the sending of the erase instruction to the secure erasing server comprises:
  sending the erase instruction to the secure erasing server, such that the secure erasing server forwards the erase instruction to the secure erasing daemon process on the host machine;
  adding, by the secure erasing daemon process, a file corresponding to the cloud host to be erased to an erase queue according to the erase instruction, and generating a corresponding erase task;
  configuring the erase task in the erase queue with low priority via the secure erasing daemon process; and
  executing, by the secure erasing daemon process, the erase tasks in the erase queue respectively with low priority according to an erasing manner corresponding to the cloud host to be erased.

2. The method of claim 1, further comprising:
  receiving an erase completion instruction sent by the secure erasing server; and
  erasing a virtual machine corresponding to the cloud host to be erased on the host machine according to the erase completion instruction.

3. The method of claim 1, further comprising:
  determining an input/output (I/O) resource consumption of a disk according to a disk space, a space occupied by the cloud host to be erased, and the corresponding erasing manner.

4. A server configured to erase a cloud host in a cloud-computing environment, comprising a processor; and a memory storing instructions, which, when executed by the processor cause the processor to perform steps comprising:
  receiving a request of secure erasing a cloud host;
  receiving a selection from a user, and determining the cloud host to be erased and a corresponding erasing manner according to the selection;
  shutting down the cloud host to be erased on the corresponding host machine according to the request of secure erasing a cloud host;
  generating an erase instruction according to the request of secure erasing the cloud host; and
  sending the erase instruction to a secure erasing server, such that the secure erasing server calls a secure erasing daemon process on a corresponding host machine according to the erase instruction, and erases the cloud host to be erased from the host machine via the secure erasing daemon process wherein the sending of the erase instruction to the secure erasing server comprises:
    sending the erase instruction to the secure erasing server, such that the secure erasing server forwards the erase instruction to the secure erasing daemon process on the host machine;
    adding, by the secure erasing daemon process, a file corresponding to the cloud host to be erased to an erase queue according to the erase instruction, and generating a corresponding erase task;
    configuring the erase task in the erase queue with low priority via the secure erasing daemon process; and
    executing, by the secure erasing daemon process, the erase tasks in the erase queue respectively with low priority according to the erasing manner corresponding to the cloud host to be erased.

5. The server of claim 4, wherein when executed by processor, the instructions further cause the processor to perform steps comprising:
  receiving an erase completion instruction sent by the secure erasing server; and
  erasing a virtual machine corresponding to the cloud host to be erased on the host machine according to the erase completion instruction.

6. The server of claim 4, wherein when executed by processor, the instructions further cause the processor to perform steps comprising:
  determining the disk I/O resource consumption according to a disk space, a space occupied by the cloud host to be erased, and the corresponding erasing manner.

7. At least one non-transitory computer-readable storage medium having computer-readable instructions stored thereon, the instructions when executed by at least one processor cause the at least one processor to perform steps comprising:
  receiving a request of secure erasing a cloud host;
  receiving a selection from a user, and determining the cloud host to be erased and a corresponding erasing manner according to the selection;
  shutting down the cloud host to be erased on the corresponding host machine according to the request of secure erasing a cloud host;
  generating an erase instruction according to the request of secure erasing the cloud host; and
  sending the erase instruction to a secure erasing server, such that the secure erasing server calls a secure erasing daemon process on a corresponding host machine according to the erase instruction, and erases the cloud host to be erased from the host machine via the secure erasing daemon process, wherein sending the erase instruction to the secure erasing server comprises:
    sending the erase instruction to the secure erasing server, such that the secure erasing server forwards the erase instruction to the secure erasing daemon process on the host machine;
    adding, by the secure erasing daemon process, a file corresponding to the cloud host to be erased to an erase queue according to the erase instruction, and generating a corresponding erase task;
    configuring the erase task in the erase queue with low priority via the secure erasing daemon process; and
    executing, by the secure erasing daemon process, the erase tasks in the erase queue respectively with low priority according to the erasing manner corresponding to the cloud host to be erased.

8. The non-transitory computer-readable storage medium of claim 7, wherein when executed by processor, the instructions further cause the processor to perform steps comprising:
  receiving an erase completion instruction sent by the secure erasing server; and
  erasing a virtual machine corresponding to the cloud host to be erased on the host machine according to the erase completion instruction.

9. The non-transitory computer-readable storage medium of claim 7, wherein when executed by the processor, the instructions further cause the processor to perform steps comprising:
  determining the disk I/O resource consumption according to a disk space, a space occupied by the cloud host to be erased, and the corresponding erasing manner.

* * * * *